United States Patent
Holtzman et al.

(10) Patent No.: US 6,760,587 B2
(45) Date of Patent: Jul. 6, 2004

(54) FORWARD-LINK SCHEDULING IN A WIRELESS COMMUNICATION SYSTEM DURING SOFT AND SOFTER HANDOFF

(75) Inventors: Jack M. Holtzman, San Diego, CA (US); Gang Bao, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 303 days.

(21) Appl. No.: 09/792,518

(22) Filed: Feb. 23, 2001

(65) Prior Publication Data

US 2002/0160783 A1 Oct. 31, 2002

(51) Int. Cl.[7] ............................ H04Q 7/20; H04Q 7/34
(52) U.S. Cl. .................. 455/436; 455/437; 455/438; 455/442; 455/69; 455/522; 370/331; 370/332
(58) Field of Search ........................... 455/436, 437, 455/438, 439, 442, 443, 445, 403, 422, 69, 522, 67.1, 517, 423, 424, 425, 561, 562; 370/331, 332

(56) References Cited

U.S. PATENT DOCUMENTS

| | | | |
|---|---|---|---|
| 4,901,307 A | | 2/1990 | Gilhousen et al. |
| 5,056,109 A | | 10/1991 | Gilhousen et al. |
| 5,103,459 A | | 4/1992 | Gilhousen et al. |
| 5,267,261 A | | 11/1993 | Blakeney, II et al. |
| 5,414,796 A | | 5/1995 | Jacobs et al. |
| 5,504,773 A | | 4/1996 | Padovani et al. |
| 5,918,184 A | * | 6/1999 | Wang .......................... 455/561 |
| 6,263,205 B1 | * | 7/2001 | Yamaura et al. ............. 455/522 |
| 6,285,886 B1 | * | 9/2001 | Kamel et al. ................ 455/522 |
| 2001/0033558 A1 | * | 10/2001 | Matsuki ...................... 370/331 |

* cited by examiner

Primary Examiner—William Trost
Assistant Examiner—Keith Ferguson
(74) Attorney, Agent, or Firm—Philip Wadsworth; Sandra L. Godsey

(57) ABSTRACT

A method and apparatus for scheduling transmit rates and power levels for data in conjunction with a voice-data communication during conditions of soft and softer handoff. During conditions of no handoff, or hard handoff, an algorithm selects a slot reflecting a favored power level and transmission rate for transmitting the non-voice data on a supplemental channel. The slot is selected based upon the transmission power levels for voice-data transmitted by a base station to a remote station on a fundamental channel. The algorithm applies to softer handoff using information from all the sectors of a base station involved in the softer handoff. During soft handoff, instead of scheduling forward link transmission based on recent power and rate, or C/I information, data is continuously transmitted to the user at a power level based on average required power.

10 Claims, 12 Drawing Sheets

FORWARD-LINK SCHEDULING IN A WIRELESS COMMUNICATION SYSTEM DURING SOFT AND SOFTER HANDOFF

CROSS-REFERENCE TO RELATED APPLICATION

This application is related to U.S. application Ser. No. 09/528,235, filed Mar. 17, 2000, which is a continuation in part of U.S. application Ser. No. 09/414,759, filed Oct. 7, 1999, now U.S. Pat. No. 6,621,804, issued Sep. 16, 2003 to Holtzman et al.

BACKGROUND

1. Field

The disclosed embodiments relate generally to wireless communications, and more specifically to performing forward-link scheduling in a wireless communication system.

2. Background

Traditionally, wireless communication systems were required to support a variety of services. One such communication system is a code division multiple access (CDMA) system which conforms to the "TIA/EIA/IS-95 Mobile Station-Base Station Compatibility Standard for Dual-Mode Wideband Spread Spectrum Cellular System," hereinafter referred to as IS-95. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention, and co-pending U.S. patent application Ser. No. 09/382,438, entitled "METHOD AND APPARATUS USING A MULTI-CARRIER FORWARD LINK IN A WIRELESS COMMUNICATION SYSTEM," each of which is incorporated by reference herein.

More recently, wireless systems such as the CDMA systems mentioned above have offered hybrid services, such as providing both wireless voice and data communications. To coordinate the implementation of such services, the International Telecommunications Union requested the submission of proposed standards for providing high-rate data and high-quality speech services over wireless communication channels. A preliminary proposal was issued by the Telecommunications Industry Association, entitled "The cdma2000 ITU-R RTT Candidate Submission," incorporated by reference herein and hereafter referred to as cdma2000. Various methods for transmitting non-voice data over fundamental and supplemental channels are disclosed in cdma2000.

In a CDMA system, a user communicates with the network through one or more base stations. For example, a user on a remote station (RS) may communicate with a land-based data source, such as the Internet, by transmitting data to a base station (BS) via a wireless link. A remote station may comprise a cellular telephone for mobile subscribers, a cordless telephone, a paging device, a wireless local loop device, a personal digital assistant (PDA), an Internet telephony device, a component of a satellite communication system, or any other component device of a communications system. The link between the RS and the BS is commonly referred to as the "reverse link." The BS receives the data and routes it through a base station controller (BSC) to the land-based data network. When data is transmitted from the BS to the RS, it is transmitted on the "forward link." In CDMA IS-95 systems, the forward link (FL) and the reverse link (RL) are allocated to separate frequencies.

The remote station communicates with at least one base station during a communication. However, CDMA RSs are also capable of communicating with multiple BSs simultaneously, such as during soft handoff. Soft handoff is a process of establishing a new forward and reverse link with a new base station before breaking the old links with the previous base station. Soft handoff minimizes the probability of dropped calls, that is, where a call is inadvertently disconnected from the system. A method and apparatus for providing communications between an RS and more than one BS during the soft handoff process is disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is a process of establishing a new forward and reverse link with a new sector of a current base station before breaking the old links with the previous sector.

Given the growing demand for wireless data applications, the need for very efficient voice and data wireless communication systems has become increasingly significant. One method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, non-voice data or voice data is partitioned into code channel frames that are 20 msec wide with data rates as high as 14.4 kbps.

A significant difference between voice services and data services is the fact that voice services have stringent fixed delay requirements. Typically, the overall one-way delay of voice services must be less than 100 msec. In contrast, selectively planned data service delays, even above 100 msec, can be used to optimize the efficiency of the communication system. For example, error correction coding techniques that require relatively long delays can be used with data service transmissions.

Some parameters that measure the quality and effectiveness of data transmissions are the transmission delay required for transferring a data packet, and the average throughput rate of the system. As explained above, a transmission delay does not have the same impact in data or "non-voice" communication as it does for a voice or "voice-data" communication. Still, delays cannot be ignored because they are an important metric for measuring the quality of the data communication system. The average throughput rate is reflective of the efficiency of the data transmission capability of the communication system.

Further, in a wireless communication system, capacity is maximized when the transmission energy for a signal is kept to a minimum value while satisfying the quality performance requirements for the signal. That is, the quality of transmitted voice-data or non-voice data cannot be significantly degraded when received. One measure of the quality of a received signal is the carrier-to-interference ratio (C/I) at the receiver. Thus, it is desirable to provide a transmission power control system that maintains a constant C/I at a receiver. Such a system is described in detail in U.S. Pat. No. 5,056,109 entitled "Method and Apparatus for Controlling Transmission Power in a CDMA Cellular Telephone System," assigned to the assignee of the present invention and incorporated by reference herein.

It is well known that in cellular systems the C/I of any given user is a function of the location of the RS within a coverage area. In order to maintain a given level of service, TDMA and FDMA systems resort to frequency reuse techniques, i.e. not all frequency channels and/or time slots are used in each base station. In a CDMA system, the same frequency channel allocation is reused in every cell of the system, thereby improving the overall efficiency. The C/I associated with an RS determines the information rate that can be supported on the forward link from the base station to the user's RS. An exemplary system for transmitting high rate digital data in a wireless communication system is disclosed in co-pending U.S. patent application Ser. No. 08/963,386, entitled "METHOD AND APPARATUS FOR HIGH RATE PACKET DATA TRANSMISSION," now U.S. Pat. No. 6,574,211, issued Jun. 3, 2003 to Padovani et al., assigned to the assignee of the present application and incorporated by reference herein.

Because the C/I associated with a RS determines the information rate that can be supported on the forward link, it is useful to know transmission information for each frequency channel used and historic C/I information. This information is commonly collected at the RS and messaged to the BS. But this messaging uses valuable system resources. What is needed is an invention that would eliminate such messaging requirements. Preferably, the BS transmission power levels on a first channel would be used to predict favorable slots for transmitting additional data on a second channel.

It is well known in the art that knowledge of a communication channel can be used to increase capacity in a CDMA system by transmitting mostly at times when channel conditions are good. See, e.g., S. W. Kim & A. Goldsmith, "Truncated Power Control in Code Division Multiple Access Communications," Globecom (1997); R. Knopp & P. Humblet, "Multiple-Accessing over Frequency-Selective Fading Channels," PIMRC (1995); A. Goldsmith & P. Varaiya, "Increasing Spectral Efficiency Through Power Control," ICC (1993). This technique is commonly referred to as "waterfilling." An issue that arises in cellular or PCS CDMA systems is fairness in that users nearer to a given BS may be favored in a waterfilling approach. Accordingly, there is a tradeoff between total throughput and fairness among users.

An algorithm based on priority given just by the carrier-to-interference ratio (C/I) would always give all the power to the user close to the BS with the best channel. This would maximize system throughput, but be unfair to users that are far from the BS. One solution, recently introduced by D. Tse and entitled "Forward-Link Multiuser Diversity Through Rate Adaptation and Scheduling" (not yet published), attempts to compromise between throughput and fairness by including throughput monitoring that introduces fairness by raising the priority of users who do not transmit overly long. Nevertheless, a need exists in the art to provide an improved forward-link scheduling technique that compromises between fairness and system throughput and is suitable for multiple users.

SUMMARY

Embodiments disclosed herein address the above-stated needs by providing methods extended to soft and softer handoff for scheduling transmit rates and transmit power levels for data on a supplemental channel used in a wireless communication system. Accordingly, in one aspect of the invention, a method of scheduling transmit rates and transmit power levels of data users in a wireless communication system during softer handoff includes transmitting signals between a base location having at least two sectors and a remote station via at least one first channel per sector, wherein the transmitted signals comprise voice-data, measuring at the base location a ratio of transmission power levels for the voice-data transmitted via the least one first channel per sector; determining a historical profile for the ratio of transmission power levels; and using the historical profile for the transmission power ratio levels to select a second channel transmission power level and data rate for transmitting additional data.

In another aspect, a method of scheduling transmit rates and transmit power levels of data users in a wireless communication system includes, transmitting signals between a base location and a remote station via at least one first channel, wherein the transmitted signals comprise voice-data, measuring at the base location transmission power levels for the voice-data transmitted via the least one first channel, determining a historical profile for the transmission power levels, using the historical profile for the transmission power levels to select a second channel transmission power level and data rate for transmitting additional data, selecting a soft handoff power level and transmission rate based on average required power, and transmitting continuously to the user at the soft handoff power level and transmission rate during soft handoff.

DETAILED DESCRIPTION

FIGS. 1–10 illustrate examples of the various method and apparatus aspects of the disclosed embodiments. For ease of explanation, but without any limitation intended, the apparatus examples are described in the context of a signal processing apparatus that may be embodied by various hardware components and interconnections. Further arrangements for these signal-processing apparatuses will become apparent to anyone skilled in the art after reading the descriptions that follow.

OPERATION

IS-95 supports medium data (MDR) transmission of data by allowing a base location (BS) to communicate with a remote station (RS) using up to eight (8) forward links and up to eight (8) reverse links. Further advances have been made allowing for even higher data rate (HDR) transmissions using somewhat similar systems. Generally, data can be more efficiently communicated between a BS and a RS if it is transmitted at the lowest possible power level required for maintaining the quality of the communication.

Transmission of voice-data generally relies on the large number of uncorrelated users communicating with a base station and well-behaved Markov voice statistics to balance both RF capacity and RF stability. These large numbers of uncorrelated users result in a forward link RF transmit power distribution that is predictably stationary and log-normal. Without this forward link RF power predictability, forward link power control and mobile assisted handoff would be unstable.

However, transmission of non-voice data, such as downloading data from the Internet, is not as well-behaved. Data traffic often comes in bursts, resulting in relatively long periods of maximum rate transmission followed by relatively long periods of minimum rate transmission. With the advent of MDR and HDR networks, these effects become even more pronounced. Unlike correlated voice links, these links switch between maximum rate and minimum rate together and power control together. This can cause the forward link power distribution as a whole to be decidedly non-stationary and non-log-normal.

In a typical communication network, RS users (users) have different radio frequency (RF) requirements depending upon their location relative to the base station or stations with which they are in communication. The worse a user's RF environment, the more power a base station requires to deliver a fixed amount of data. Therefore, users experiencing a poor RF environment use more network capacity. For example, users in different physical locations will experience different fading conditions, such as a user passing into the RF shadow of a building, whereas another user may be passing into the RF shadow of a tree. These conditions will reduce the strength of the received signals, resulting in a poorer quality received signal than if the fade had not occurred. To overcome fading, transmission power may be increased.

Figure 1:
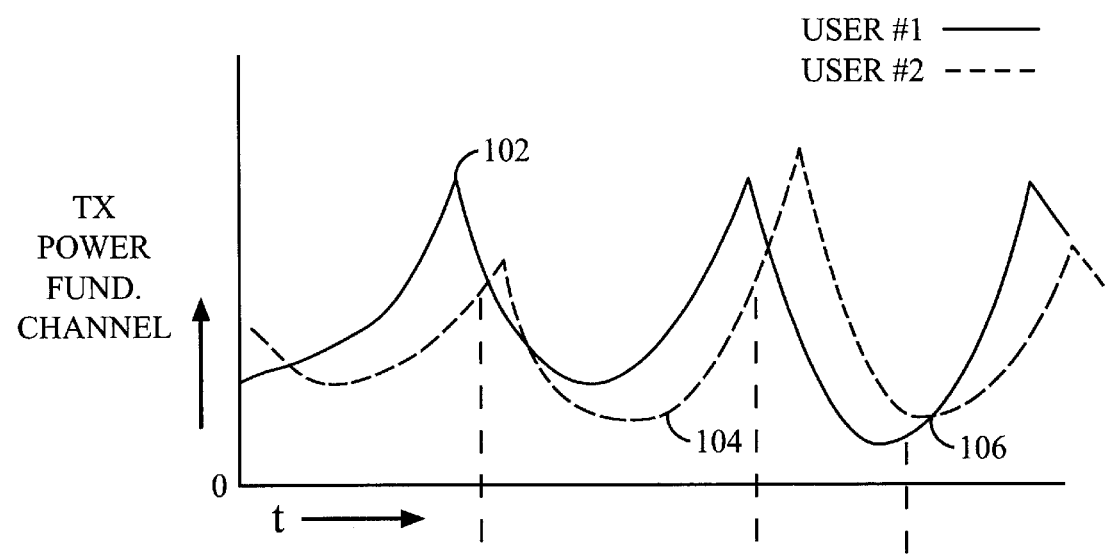
FIG. 1 illustrates transmission power fluctuations with respect to time in accordance with one embodiment.
Figure 2:
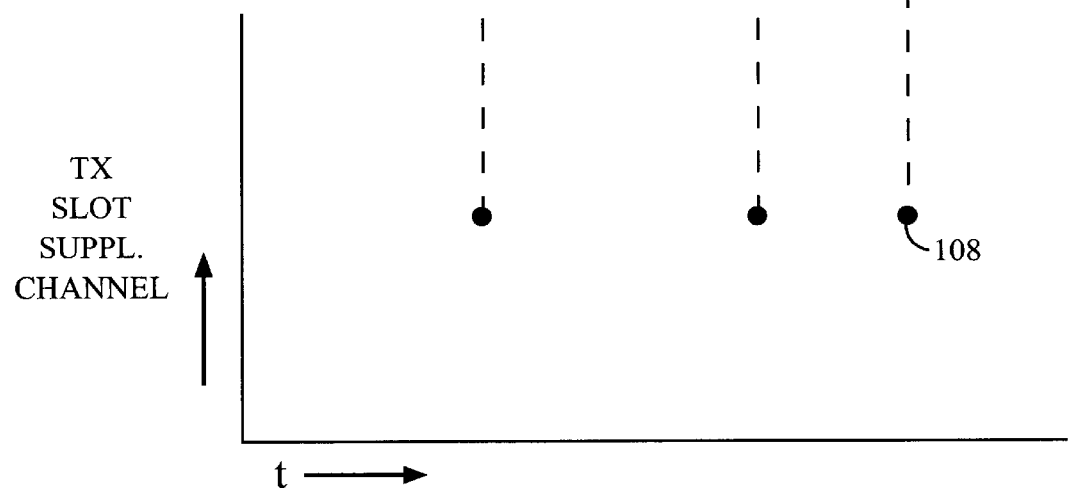
FIG. 2 illustrates favorable supplemental channel transmission powers in accordance with an exemplary embodiment.

As shown in FIG. 1, the transmission power level for voice-data transmitted from a BS to a RS may vary with time. For example, at time 102 the power level used to transmit voice-data to a user #1 from a BS is at a maximum. At time 104, the power level required to transmit voice-data to a user #2 is at a minimum. At time 106, the average voice-data transmission power level for users #1 and #2 is at a minimum. In one embodiment of the invention, the slot 108 shown in FIG. 2 is a favorable time, or slot, to transmit additional data on the data channel of user #2. This determination is made using the voice-data transmission power levels as measured at the base location. Selecting non-voice data to be transmitted to a user on a second channel based on predicted BS power levels for voice-data transmissions on a first channel maximizes overall data through-put and does not require any quality metric messaging from the RS to the BS regarding the second channel.

This basic method assures that voice-data transmissions are guaranteed: 1) a minimum bandwidth; 2) a maximum delay window; and, 3) a given data rate. However, non-voice data users generally have less stringent communication quality requirements so the transmission data rate can be varied. However, the invention can also be used for solely non-voice data transmissions. In this embodiment, non-voice data is communicated using one or more forward link channels, but having an overall fixed total transmission power. The communication transmits at data rates that ensure the transmission power level is below the total allowable transmission power level. This is accomplished first by using a full-rate fundamental channel and then adding supplemental channels for transmitting. The transmission power used to transmit on the supplemental channels is determined from the transmission power measured at the BS for transmissions on the fundamental channel. Regardless, the transmission power levels for the channels used to transmit the non-voice data aggregate to a value below the total allowable transmission power.

Figure 3:
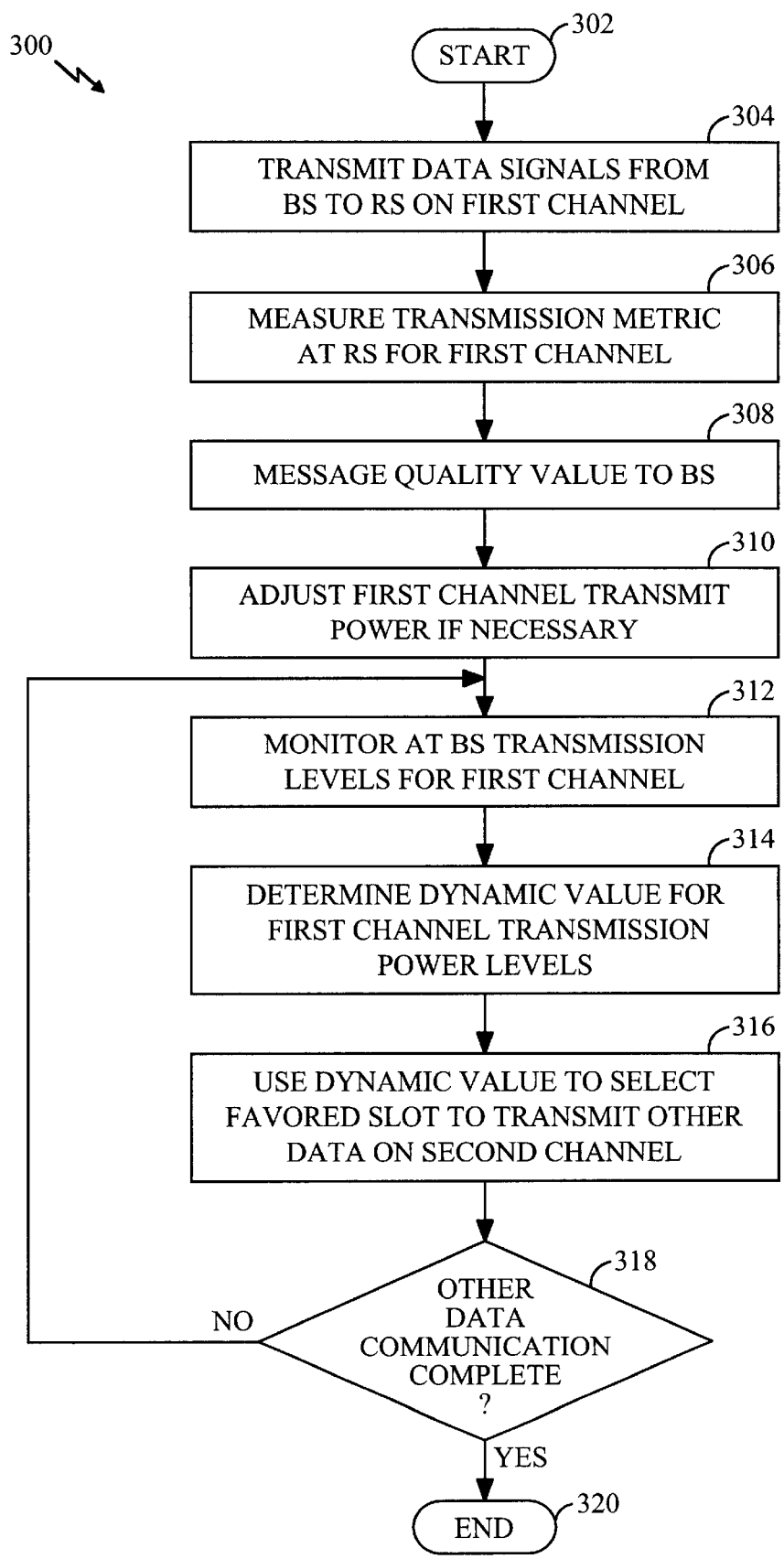
FIG. 3 shows a flow chart illustrating an operating sequence in accordance with an exemplary embodiment.

FIG. 3 is a flow chart reflecting method steps 300 used in a CDMA network in accordance with an exemplary embodiment. The method starts at step 302, and data signals are transmitted in task 304 from a BS to a RS. As discussed above, this transmitted data may comprise voice and/or non-voice data transmitted on a first channel, also referred to herein as a fundamental channel. A first channel is a portion of the Forward Link Channel that carries a combination of higher-level data and power control information from the BS to the RS. A second channel is a portion of the Forward Link Channel that operates in conjunction with the first channel or a forward dedicated control channel to provide increased data delivery services. A second channel is commonly referred to as a supplemental channel, but could be a dedicated fundamental channel.

As voice-data transmissions occur, the RS receiving the transmission measures pre-selected metrics reflective of the quality of the communication received. These metrics can include bit error rate as well as other commonly used metrics. If the quality of the received signal falls off and remains poor, the RS messages a representative value to the BS in task 308. This message may indicate that an increase, decrease, or no change in transmission power for data transmitted on the first channel is required. If necessary, the transmission power level may be adjusted in task 310.

As the BS transmits data on the fundamental channel, the transmission power levels are monitored at the BS in task 312. A dynamic value reflecting the aggregated transmission levels, and distributions is determined in task 314. In this embodiment, the dynamic value may reflect the momentary average transmission power level. In other embodiments, the dynamic value may be determined in a multitude of ways known in the art, so long as the dynamic value represents the lowest transmission power value at a selected point in time for first channel transmissions. Using these dynamic values, the most favored slot for transmission of data on a second channel may be predicted in task 316. Non-voice data for a RS user in need of the data may be selected and the data transmitted. If the non-voice data communication is complete, then the method ends in task 320. However, if the communication is not complete, or if a transmissions intended for another user is desired, then the method repeats itself in task 318. One skilled in the art will understand that ordering of steps illustrated in FIG. 3 is not limiting. The method is readily amended by omission or re-ordering of the steps illustrated without departing from the scope of the disclosed embodiments.

Hardware Components and Interconnections

In addition to the various method embodiments described above, a different aspect of the invention concerns apparatus embodiments used to perform the methods.

Figure 4B:
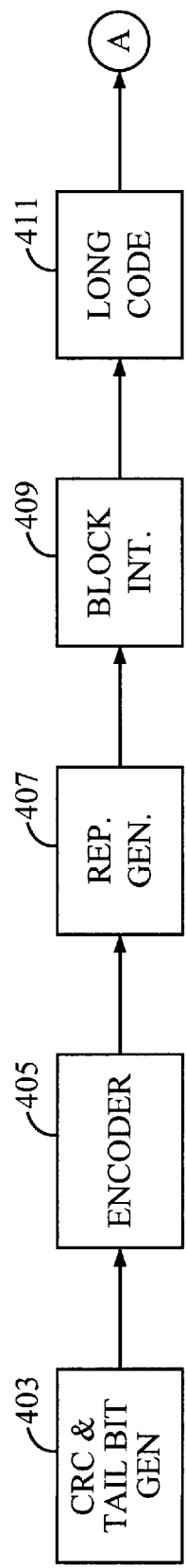
FIG. 4B is a block diagram of a general channel structure used in accordance with an exemplary embodiment.
Figure 4A:
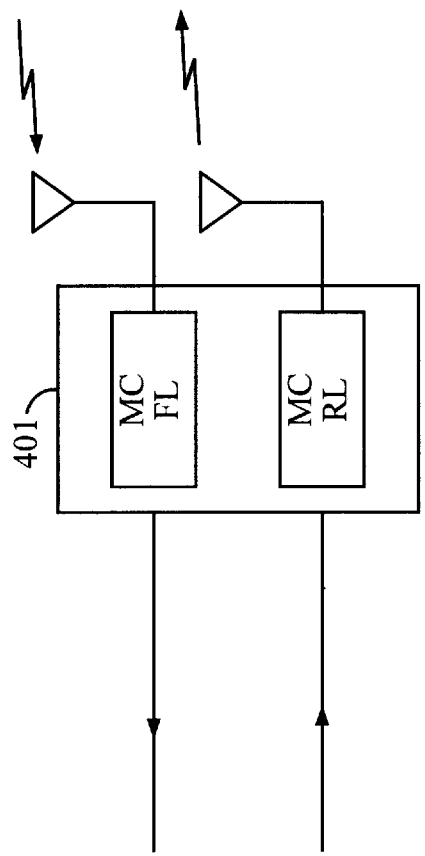
FIG. 4A is a block diagram of a general configuration for a mobile station used in accordance with the invention.

FIG. 4A shows a simple block representation of a mobile station (MS) 401 configured for use in accordance with an exemplary embodiment. MS 401 receives a signal from a base station (not shown) using a cdma2000 multi-carrier FL. The signal is processed as described below. MS 401 uses a cdma2000 RL to transmit information to the base station. FIG. 4B shows a more detailed block representation of a channel structure used to prepare information for transmission by MS 401 in accordance with an exemplary embodiment. In the figure, information to be transmitted, hereafter referred to as a signal is transmitted in bits organized into blocks of bits. A Cyclic Redundancy Check (CRC) and tail bit generator (generator) 403 receives the signal. The generator 403 uses a cyclic redundancy code to generate parity check bits to assist in determining the quality of the signal when received by a receiver. These bits are included in the signal. A tail bit—a fixed sequence of bits—may also be added to the end of a block of data to reset an encoder 405 to a known state.

The encoder 405 receives the signal and builds a redundancy into the signal for error-correcting purposes. Different "codes" may be used to determine how the redundancy will be built into the signal. These encoded bits are called symbols. The repetition generator 407 repeats the symbols it receives a predetermined number of times, thus allowing part of the symbols to be lost due to a transmission error without affecting the overall quality of the information being sent. Block interleaver 409 takes the symbols and jumbles them. The long code generator 411 receives the jumbled symbols and scrambles them using a pseudorandom noise sequence generated at a predetermined chip rate. Each symbol is XOR-ed with one of the pseudorandom chips of the scrambling sequence.

The information may be transmitted using more than one carrier (channel) as explained with regards to the method, above. Accordingly, a demultiplexer (not shown) may take an input signal "a" and split it into multiple output signals in such a way that the input signal may be recovered. In one embodiment the signal "a" is split into three separate signals, each signal representing a selected data-type, and is transmitted using one FL channel per data-type signal. In another embodiment, the demultiplexer may split signal "a" into two components per data-type. Regardless of the arrangement, the disclosed embodiments contemplate that distinct signals generated from a parent signal can be transmitted using one or more channels.

Further, this technique can be applied to multiple users whose signals are transmitted using completely or partially the same FL channels. For example, if the signals from four different users are going to be sent using the same three FL channels, then each of these signals is "channelized" by demultiplexing each signal into three components, where each component will be sent using a different FL channel. For each channel, the respective signals are multiplexed together to form one signal per FL channel. Then, using the technique described herein, the signals are transmitted. The demultiplexed signal is then encoded by a Walsh encoder (not shown) and spread into two components, components I and Q, by a multiplier (also not shown). These components are summed by a summer and communicated to a remote station (not shown).

Figure 5A:
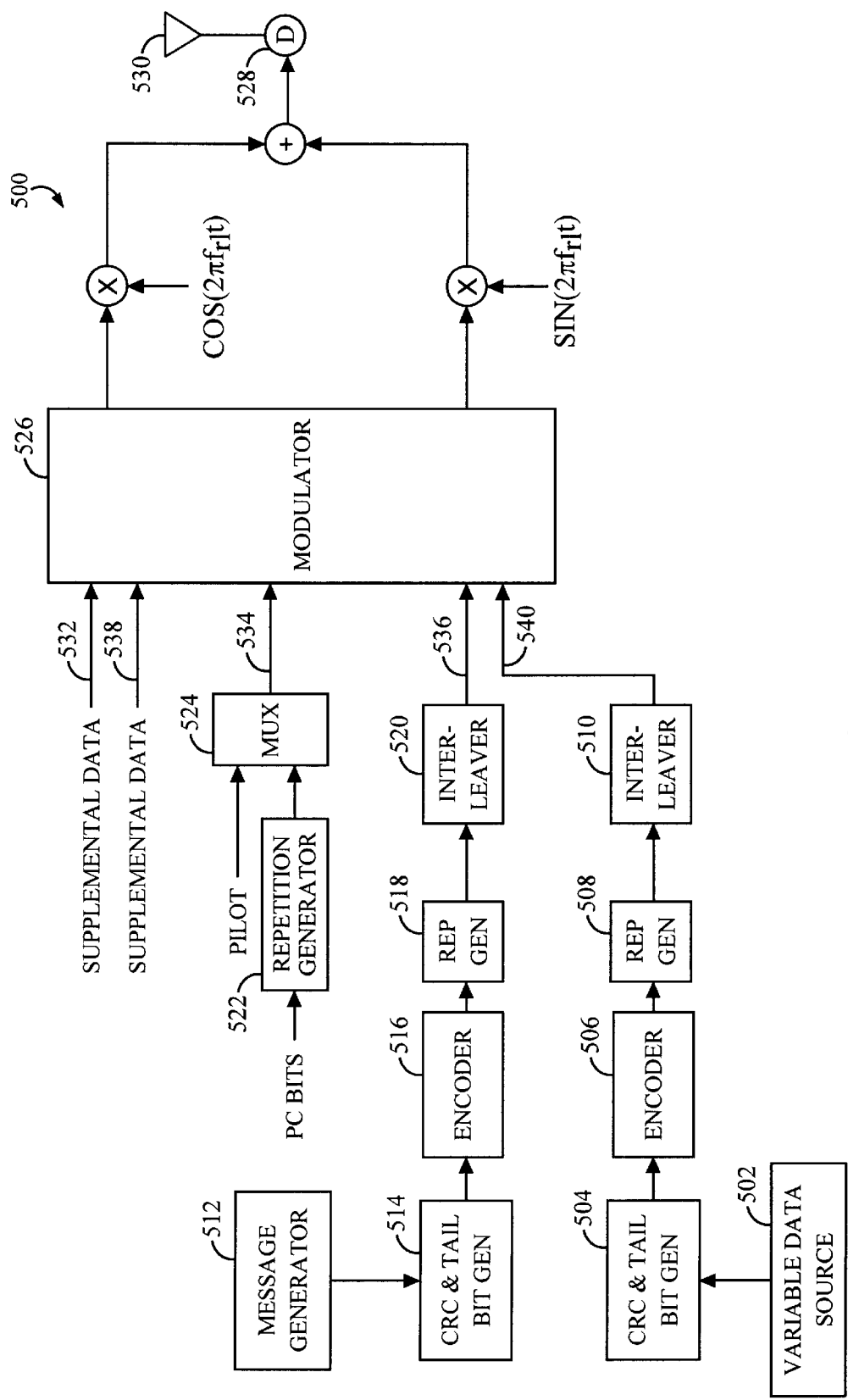
FIG. 5A is a block diagram of the hardware components and interconnections of a digital signal processing apparatus used in accordance with an exemplary embodiment.

FIG. 5A illustrates a functional block diagram of an exemplary embodiment of the transmission system embodied in a wireless communication device 500. One skilled in the art will understand that certain functional blocks shown in the figure may not be present in other embodiments of the invention. The block diagram of FIG. 5B corresponds to an embodiment consistent for operation according to the TIA/EIA Standard IS-95C, also referred to as IS-2000, or cdma2000 for CDMA applications. Other embodiments are useful for other standards including the Wideband CDMA (WCDMA) standards proposed by the standards bodies ETSI and ARIB. It will be understood by one skilled in the art that owing to the extensive similarity between the reverse link modulation in the WCDMA standards and the reverse link modulation in the IS-95C standard, extension of the disclosed embodiments to the WCDMA standards may be accomplished without departing from the scope of the disclosed embodiments.

In the exemplary embodiment of FIG. 5A, the wireless communication device transmits a plurality of distinct channels of information which are distinguished from one another by short orthogonal spreading sequences as described in the U.S. patent application Ser. No. 08/886,604, entitled "HIGH DATA RATE CDMA WIRELESS COMMNICATION SYSTEM," now U.S. Pat. No. 6,396,804, issued May 28, 2002, assigned to the assignee of the present invention and incorporated by reference herein. Five separate code channels are transmitted by the wireless communication device: 1) a first supplemental data channel 532, 2) a time multiplexed channel of pilot and power control symbols 534, 3) a dedicated control channel 536, 4) a second supplemental data channel 538 and 5) a fundamental channel 540. The first supplemental data channel 532 and second supplemental data channel 538 carry digital data which exceeds the capacity of the fundamental channel 540 such as facsimile, multimedia applications, video, electronic mail messages or other forms of digital data. The multiplexed channel of pilot and power control symbols 534 carries pilots symbols to allow for coherent demodulation of the data channels by the base station and power control bits to control the energy of transmissions of the base station or base stations in communication with wireless communication device 500. Control channel 536 carries control information to the base station such as modes of operation of wireless communication device 500, capabilities of wireless communication device 500 and other necessary signaling information. Fundamental channel 540 is the channel used to carry primary information from the wireless communication device to the base station. In the case of speech transmissions, the fundamental channel 540 carries the speech data.

Supplemental data channels 532 and 538 are encoded and processed for transmission by means not shown and provided to modulator 526. Power control bits are provided to repetition generator 522, which provides repetition of the power control bits before providing the bits to multiplexer (MUX) 524. In MUX 524 the redundant power control bits are time multiplexed with pilot symbols and provided on line 534 to modulator 526.

Message generator 512 generates necessary control information messages and provides the control message to CRC and tail bit generator 514. CRC and tail bit generator 514 appends a set of cyclic redundancy check bits which are parity bits used to check the accuracy of the decoding at the base station and appends a predetermined set of tail bits to the control message to clear the memory of the decoder at the base station receiver subsystem. The message is then provided to encoder 516, which provides forward error correction coding upon the control message. The encoded symbols are provided to repetition generator 518, which repeats the encoded symbols to provide additional time diversity in the transmission. The symbols are then provided to interleaver 520, which reorders the symbols in accordance with a predetermined interleaving format. The interleaved symbols are provided on line 536 to modulator 526.

Variable rate data source 502 generates variable rate data. In the exemplary embodiment, variable rate data source 502 is a variable rate speech encoder such as described in U.S. Pat. No. 5,414,796, entitled "VARIABLE RATE VOCODER," assigned to the assignee of the present invention and incorporated by reference herein. Variable rate vocoders are popular in wireless communications because their use increases the battery life of wireless communication devices and increases system capacity with minimal impact on perceived speech quality. The Telecommunications Industry Association has codified the most popular variable rate speech encoders in such standards as Interim Standard IS-96 and Interim Standard IS-733. These variable rate speech encoders encode the speech signal at four possible rates referred to as full rate, half rate, quarter rate, or eighth rate according to the level of voice activity. The rate indicates the number of bits used to encode a frame of speech and varies on a frame by frame basis. Full rate uses a predetermined maximum number of bits to encode the frame, half rate uses half the predetermined maximum number of bits to encode the frame, quarter rate uses one quarter the predetermined maximum number of bits to encode the frame and eighth rate uses one-eighth the predetermined maximum number of bits to encode the frame.

Variable rate date source 502 provides the encoded speech frame to CRC and tail bit generator 504. CRC and tail bit generator 504 appends a set of cyclic redundancy check bits which are parity bits used to check the accuracy of the decoding at the base station and appends a predetermined set of tail bits to the control message in order to clear the memory of the decoder at the base station. The frame is then provided to encoder 506, which provides forward error correction coding on the speech frame. The encoded symbols are provided to repetition generator 508, which provides repetition of the encoded symbol. The symbols are then provided to interleaver 510 and reordered in accordance with a predetermined interleaving format. The interleaved symbols are provided on line 540 to modulator 526.

In the exemplary embodiment, modulator 526 modulates the data channels in accordance with a code division multiple access modulation format and provides the signal through duplexer 528 for transmission through an antenna 530. In IS-95 and cdma2000 systems, a 20-ms frame is divided into sixteen sets of equal numbers of symbols, referred to as power control groups. The reference to power control is based on the fact that for each power control group, the base station receiving the frame issues a power control command in response to a determination of the sufficiency of the received reverse link signal at the base station.

Figure 5B:
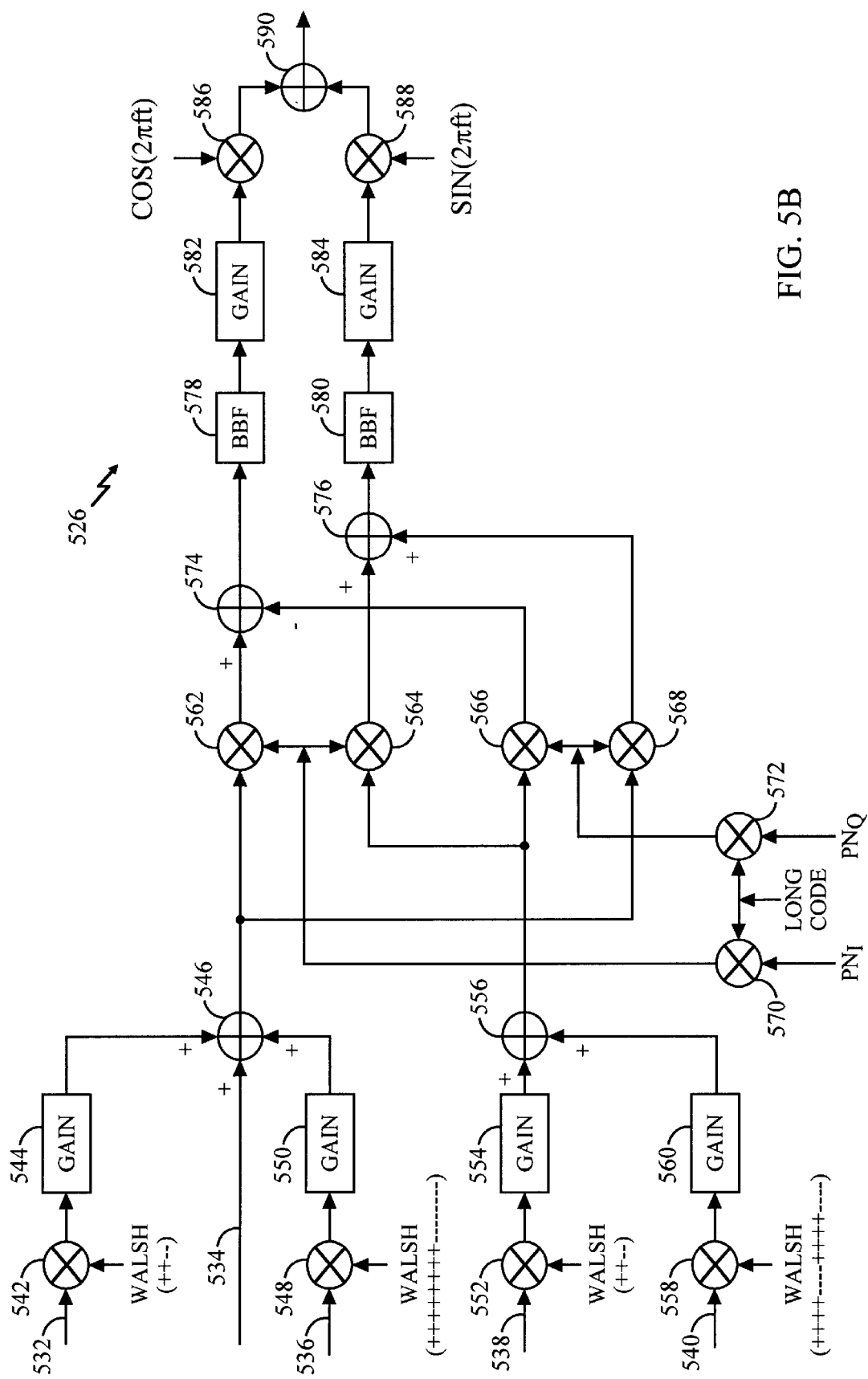
FIG. 5B is a block diagram of the hardware components and interconnections of the modulator 526 shown in FIG. 5A and used in accordance with the exemplary embodiment.

FIG. 5B illustrates a functional block diagram of an exemplary embodiment of modulator 526 of FIG. 5A. The first supplemental data channel data is provided on line 532 to spreading element 542 which covers the supplemental channel data in accordance with a predetermined spreading sequence. In the exemplary embodiment, spreading element 542 spreads the supplemental channel data with a short Walsh sequence (++--). The spread data is provided to relative gain element 544, which adjusts the gain of the spread supplemental channel data relative to the energy of the pilot and power control symbols. The gain adjusted supplemental channel data is provided to a first summing input of summing element 546. The pilot and power control multiplexed symbols are provided on line 534 to a second summing input of summing element 546.

Control channel data is provided on line 536 to spreading element 548 which covers the supplemental channel data in accordance with a predetermined spreading sequence. In the exemplary embodiment, spreading element 548 spreads the supplemental channel data with a short Walsh sequence (++++++++--------). The spread data is provided to relative gain element 550, which adjusts the gain of the spread control channel data relative to the energy of the pilot and power control symbols. The gain adjusted control data is provided to a third summing input of summing element 546. Summing element 546 sums the gain adjusted control data symbols, the gain adjusted supplemental channel symbols, and the time multiplexed pilot and power control symbols and provides the sum to a first input of multiplier 562 and a first input of multiplier 568.

The second supplemental channel is provided on line 538 to spreading element 552 which covers the supplemental channel data in accordance with a predetermined spreading sequence. In the exemplary embodiment, spreading element 552 spreads the supplemental channel data with a short Walsh sequence (++--). The spread data is provided to relative gain element 554, which adjusts the gain of the spread supplemental channel data. The gain adjusted supplemental channel data is provided to a first summing input of summer 556.

The fundamental channel data is provided on line 540 to spreading element 558, which covers the fundamental channel data in accordance with a predetermined spreading sequence. In the exemplary embodiment, spreading element 558 spreads the fundamental channel data with a short Walsh sequence (++++----++++----). The spread data is provided to relative gain element 560, which adjusts the gain of the spread fundamental channel data. The gain adjusted fundamental channel data is provided to a second summing input of summing element 556. Summing element 556 sums the gain adjusted second supplemental channel data symbols and the fundamental channel data symbols and provides the sum to a first input of multiplier 564 and a first input of multiplier 566.

In the exemplary embodiment, a pseudonoise spreading using two different short PN sequences ($PN_I$ and $PN_Q$) is used to spread the data. In the exemplary embodiment the short PN sequences, $PN_I$ and $PN_Q$, are multiplied by a long PN code to provide additional privacy. The generation of pseudonoise sequences is well known in the art and is described in detail in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention and incorporated by reference herein. A long PN sequence is provided to a first input of multipliers 570 and 572. The short PN sequence $PN_I$ is provided to a second input of multiplier 570 and the short PN sequence $PN_Q$ is provided to a second input of multiplier 572.

The resulting PN sequence from multiplier 570 is provided to respective second inputs of multipliers 562 and 564. The resulting PN sequence from multiplier 572 is provided to respective second inputs of multipliers 566 and 568. The product sequence from multiplier 562 is provided to the summing input of subtractor 574. The product sequence from multiplier 564 is provided to a first summing input of summing element 576. The product sequence from multiplier 566 is provided to the subtracting input of subtractor 574. The product sequence from multiplier 568 is provided to a second summing input of summing element 576.

The difference sequence from subtractor 574 is provided to baseband filter 578. Baseband filter 578 performs necessary filtering on the difference sequence and provides the filtered sequence to gain element 582. Gain element 582 adjusts the gain of the signal and provides the gain-adjusted signal to upconverter 586. Upconverter 586 upconverts the gain adjusted signal in accordance with a QPSK modulation format and provides the upconverted signal to a first input of summing element 590.

The sum sequence from summing element 576 is provided to baseband filter 580. Baseband filter 580 performs necessary filtering on the difference sequence and provides the filtered sequence to gain element 584. Gain element 584 adjusts the gain of the signal and provides the gain-adjusted signal to upconverter 588. Upconverter 588 upconverts the gain adjusted signal in accordance with a QPSK modulation format and provides the upconverted signal to a second input of summing element 590. Summing element 590 sums the two QPSK modulated signals and provides the result to a transmitter (not shown).

Figure 6A:
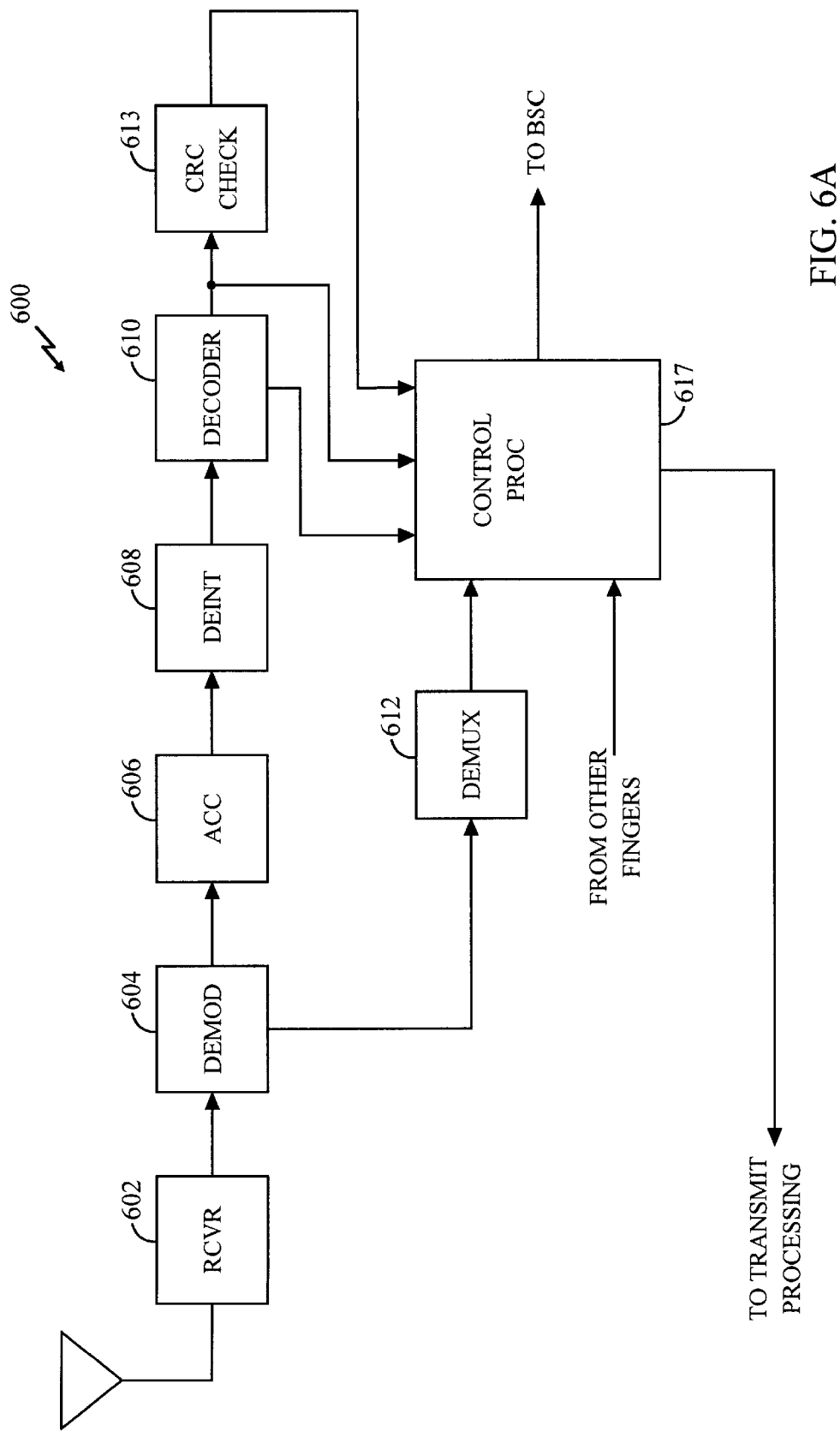
FIG. 6A is a block diagram of a portion of the hardware components and interconnections of a digital signal processing base station apparatus used in accordance with an exemplary embodiment.
Figure 6B:
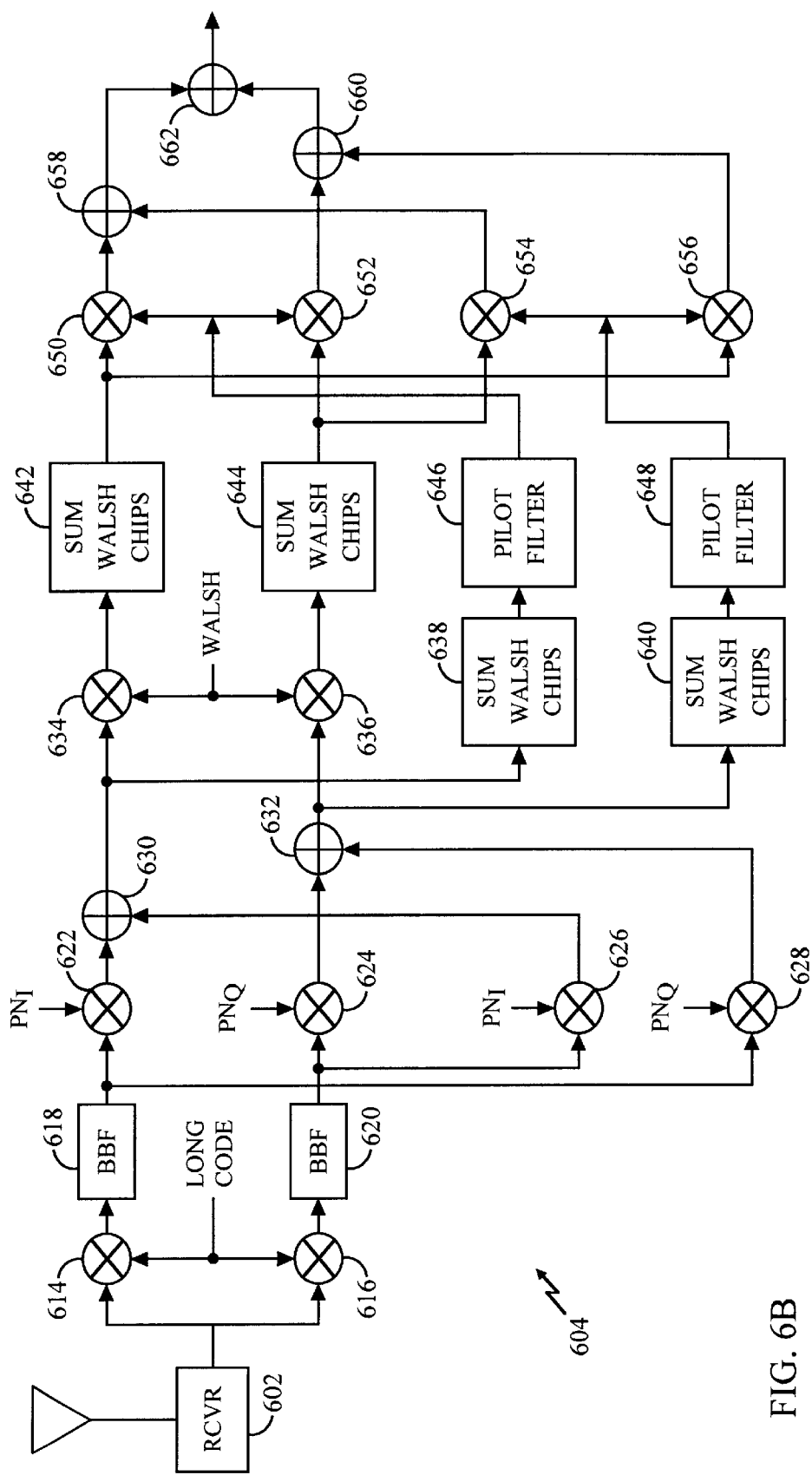
FIG. 6B is a block diagram of the hardware components and interconnections of the demodulator 604 shown in FIG. 6A and used in accordance with an exemplary embodiment.

Turning now to FIG. 6A, a functional block diagram of selected portions of a base station 600 is shown in accordance with an exemplary embodiment. Reverse-link RF signals from the wireless communication device 500 (FIG. 5B) are received by receiver (RCVR) 602, which downconverts the received reverse-link RF signals to a baseband frequency. In the exemplary embodiment, receiver 602 downconverts the received signal in accordance with a QPSK demodulation format. Demodulator 604 then demodulates the baseband signal. Demodulator 604 is further described with reference to FIG. 6B below.

The demodulated signal is provided to accumulator 606. Accumulator 606 sums the symbol energies of the redundantly transmitted power control groups of symbols. The accumulated symbol energies are provided to deinterleaver 608 and reordered in accordance with a predetermined de-interleaving format. The reordered symbols are provided to decoder 610 and decoded to provide an estimate of the transmitted frame. The estimate of the transmitted frame is then provided to CRC check 613, which determines the accuracy of the frame estimate based on the CRC bits included in the transmitted frame.

In the exemplary embodiment, base station 600 performs a blind decoding on the reverse-link signal. Blind decoding describes a method of decoding variable rate data in which the receiver does not know a priori the rate of the transmission. In the exemplary embodiment, base station 600 accumulates, deinterleaves, and decodes the data in accordance with each possible rate hypothesis. The frame selected as the best estimate is based on quality metrics such as the symbol error rate, the CRC check, and the Yamamoto metric.

An estimate of the frame for each rate hypothesis is provided to control processor 617, and a set of quality metrics for each of the decoded estimates is also provided. These quality metrics may include the symbol error rate, the Yamamoto metric, and the CRC check. Control processor 617 selectively provides one of the decoded frames to the remote station user or declares a frame erasure.

In the exemplary embodiment, demodulator 604 shown in FIG. 6A has one demodulation chain for each information channel. An exemplary demodulator 604 performs complex demodulation on signals modulated by an exemplary modulator. As previously described receiver (RCVR) 602 downconverts the received reverse-link RF signals to a baseband frequency, producing Q and I baseband signals. Despreaders 614 and 616 respectively despread the I and Q baseband signals using the long code from FIG. 5a. Baseband filters (BBF) 618 and 620, respectively, filter the I and Q baseband signals.

Despreaders 622 and 624, respectively, despread the I and Q signals using the $PN_I$ sequence of FIG. 5B. Similarly, despreaders 626 and 628, respectively, despread the Q and I signals using the $PN_Q$ sequence of FIG. 5B. The outputs of despreaders 622 and 624 are combined in combiner 630. The output of despreader 628 is subtracted from the output of despreader 624 in combiner 632. The respective outputs of combiners 630 and 632 are then Walsh-uncovered in Walsh-uncoverers 634 and 636 with the Walsh code that was used to cover the particular channel of interest in FIG. 5B. The respective outputs of the Walsh-uncoverers 634 and 636 are then summed over one Walsh symbol by accumulators 642 and 644.

The respective outputs of combiners 630 and 632 are also summed over one Walsh symbol by accumulators 638 and 640. The respective outputs of accumulators 638 and 640 are then applied to pilot filters 646 and 648. Pilot filters 646 and 648 generate an estimation of the channel conditions by determining the estimated gain and phase of the pilot signal data 534 (see FIG. 5A). The output of pilot filter 646 is then complex multiplied by the respective outputs of accumulators 642 and 644 in complex multipliers 650 and 652. Similarly, the output of pilot filter 648 is complex multiplied by the respective outputs of accumulators 642 and 644 in complex multipliers 654 and 656. The output of complex multiplier 654 is then summed with the output of complex multiplier 650 in combiner 658. The output of complex multiplier 656 is subtracted from the output of complex multiplier 652 in combiner 660. Finally, the outputs of combiners 658 and 660 are combined in combiner 662 to produce the demodulated signal of interest.

Despite the specific foregoing descriptions, ordinarily skilled artisans having the benefit of this disclosure will recognize that the apparatus discussed above may be implemented in a machine of different construction without departing from the scope of the disclosed embodiments. Similarly, parallel methods may be developed. As a specific apparatus example, one of the components such as summing element 622, shown in FIG. 6B, may be combined with summing element 626 even though they are shown as separate elements in the functional diagram.

Signal-Bearing Media

The methods described above may be implemented, for example, by operating a base station to execute a sequence of machine-readable instructions. These instructions may reside in various types of signal bearing media. In this respect, one embodiment of the invention concerns a programmed product, or article of manufacture, comprising signal-bearing media tangibly embodying a program of machine-readable instructions executable by a digital signal processor to perform the methods discussed above.

Figure 7:
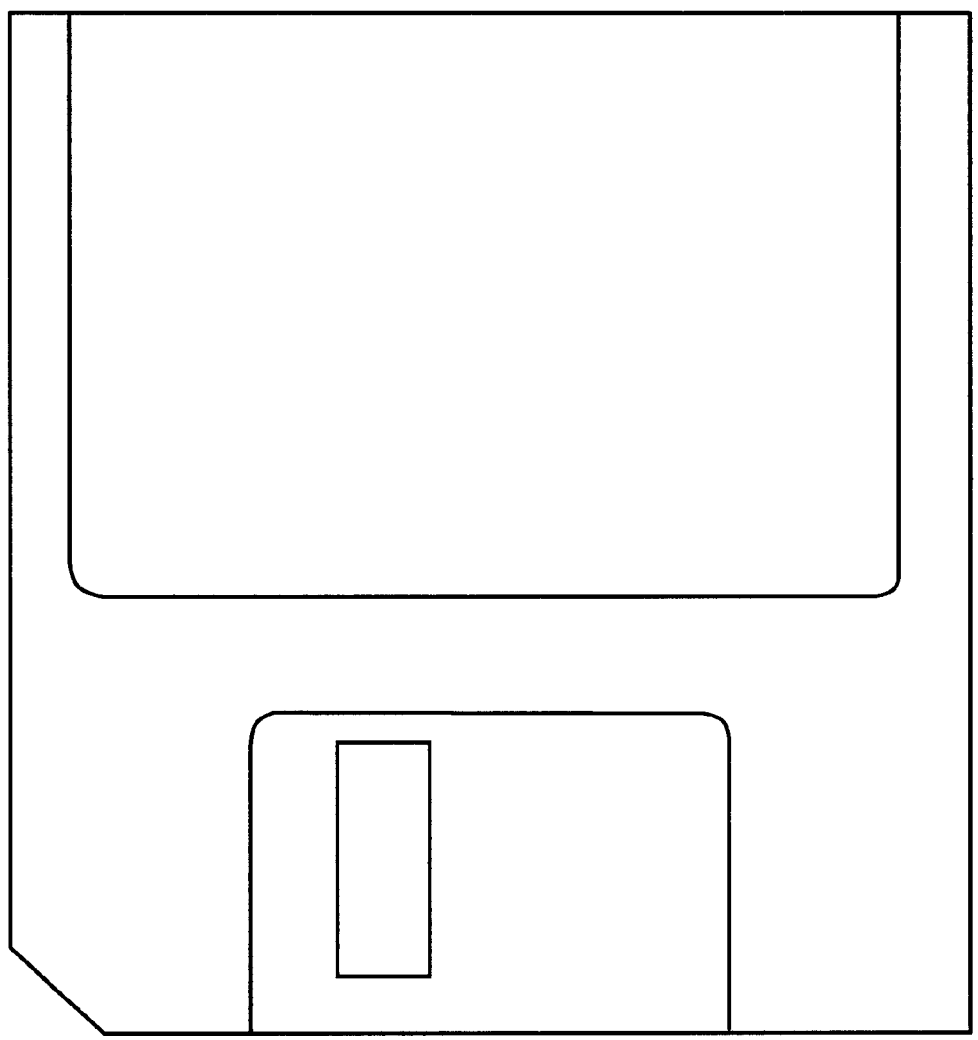
FIG. 7 is an exemplary digital data storage medium in accordance with the disclosed embodiments.

The signal bearing media may comprise any type of digital data storage media. An exemplary digital data storage medium is shown in FIG. 7. Other exemplary storage media may comprise an application specific integrated circuit (ASIC), a digital data or optical storage device accessible by the base station, electronic read-only memory, or other suitable signal bearing media. In an illustrative embodiment of the invention, the machine-readable instructions may comprise software object code, compiled from a language such as C, C+, C++, or other coding language.

Forward-Link Scheduling Algorithm

Figure 8:
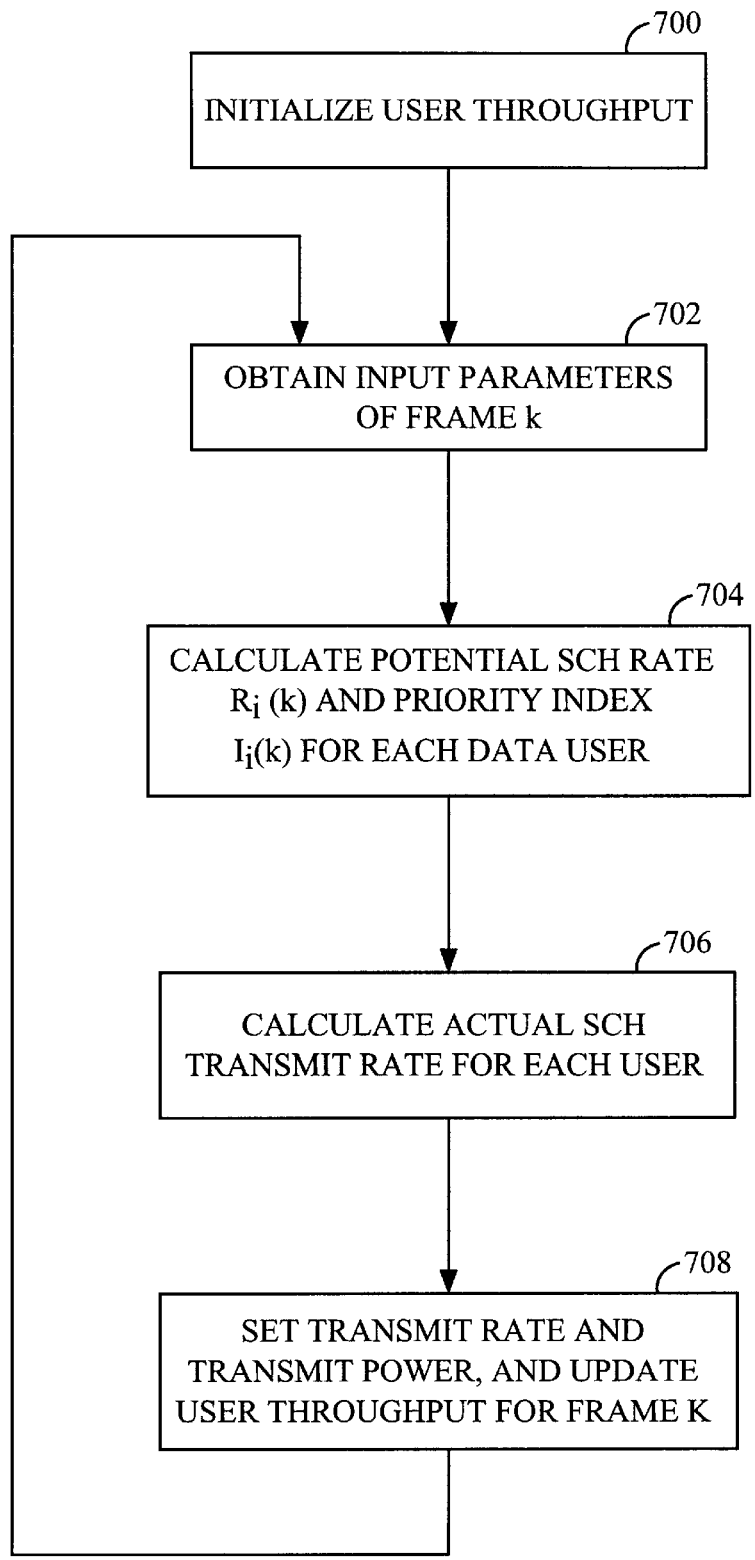
FIG. 8 is a flow chart illustrating method steps performed by a base station in a wireless communication system to accomplish forward-link scheduling.

In one embodiment a BS (not shown) is configured to perform the method steps illustrated in the flow chart of FIG. 8 to accomplish forward-link scheduling in a wireless communication system. The following conditions may be applied in accordance with a specific embodiment: (1) There are N supplemental channel (SCH) data users, each associated with a fundamental channel (FCH); the SCH active set=1, and the FCH active set $\geq 1$; (3) a Turbo decoder is used for the SCH and a convolutional decoder is used for the FCH; (4) blind rate determination is used for SCH users to determine up to three rates (as needed for fast prediction); (5) a predictor is available at the BS (although not in a system simulation) to predict the required FCH power at the beginning of a frame; (6) the power available for data users $P_a = P_{max} - \Sigma$FCH power–Other powers, where $P_{max}$ is the total power, and Other powers are overhead power levels (e.g., for the pilot channel, the paging channel, the sync channel, and the control channel (CCH)); (7) after the powers and the rates of transmitted users are determined using margins, the powers are increased proportionally to use all of the available power $P_a$; (8) a system simulator should include frame timing, fading changes at every frame, individual queues for data users, and FCH power required for each frame.

In step 700 the BS initializes the user throughput, $T_i(O)$. The BS then proceeds to step 702. In step 702 the BS obtains input parameters for the kth frame. The BS then proceeds to step 704. In step 704 the BS calculates the potential SCH rate, $R_i(k)$, and priority index, $I_i(k)$, for each data user. The BS then proceeds to step 706. In step 706 the BS calculates the actual SCH transmit rate for each user, assuming $S=\{1,2,\ldots,N\}$, $P_r(k) = P_a(k)$, where $P_r(k)$ = remaining power available, and S is the new user set. The BS then proceeds to step 708. In step 708 the BS sets the transmit rate and the transmit power, and updates the user throughput, $T_i(k)$. The BS then returns to step 702. The iterations continue until all of the frames are processed.

Figure 9A:
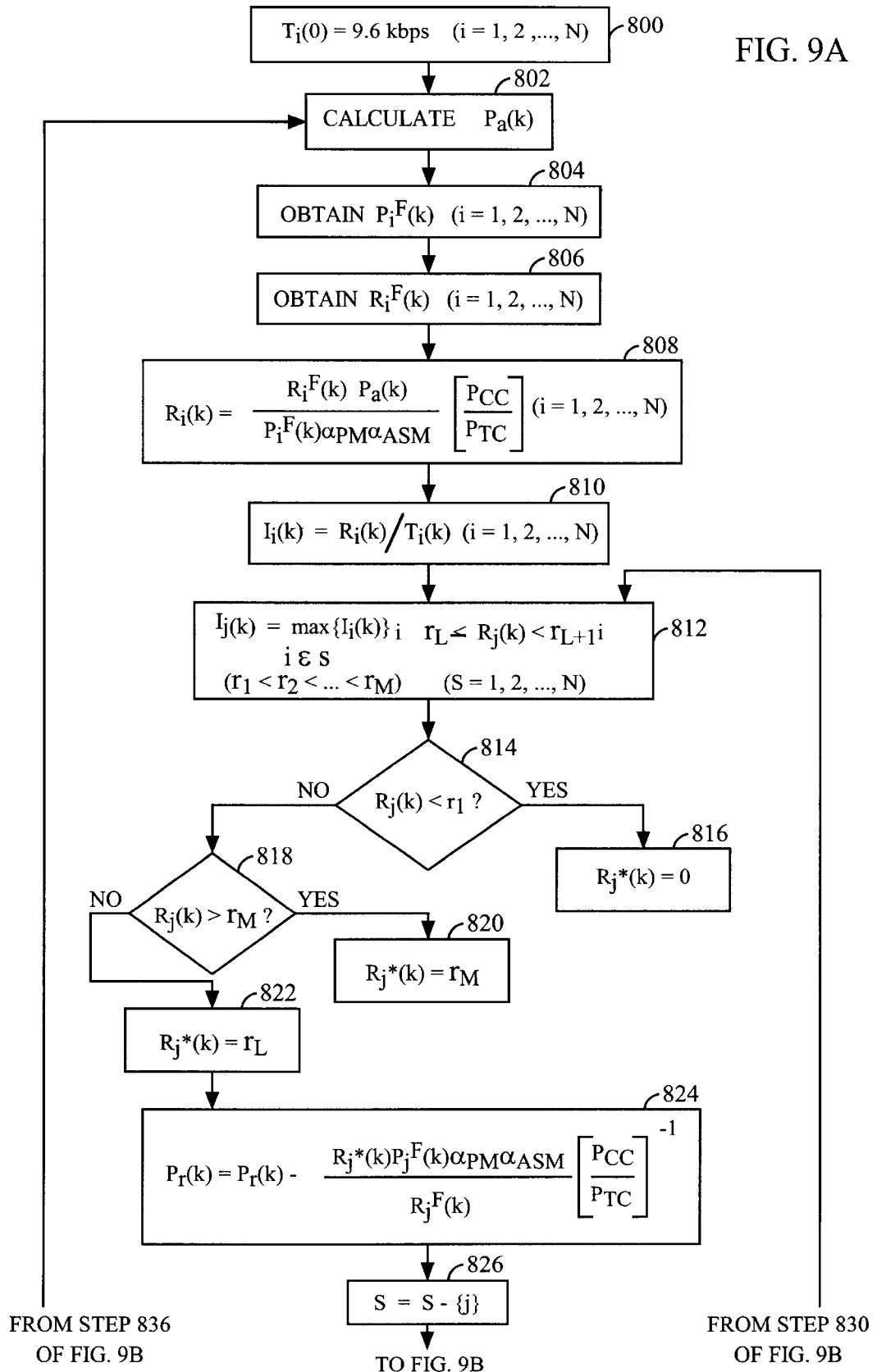
FIGS. 9A and 9B are flow charts illustrating in detail method steps performed by a base station in a wireless communication system to accomplish forward-link scheduling.
Figure 9B:
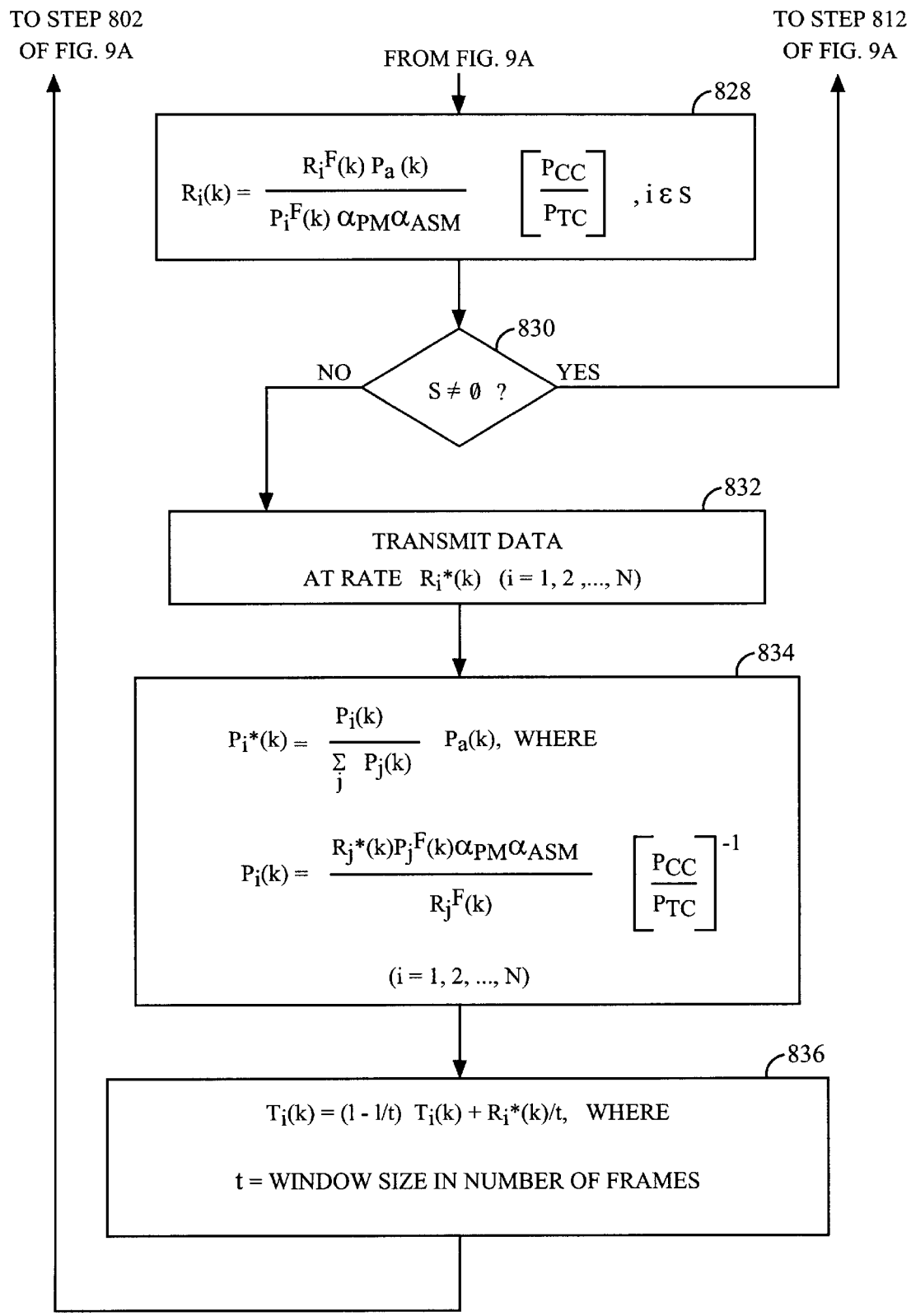

In accordance with a particular embodiment, the algorithm steps taken by the BS in FIG. 8 are described in greater detail with reference to the flow chart of FIG. 9. In step 800 of FIG. 9, a BS (not shown) initializes the user throughput by setting $T_i(O)$ equal to 9.6 kbps for $i=1,2,\ldots,N$, where i is an index specifying the user number, and N is the total number of users. In another embodiment the user throughput is initialized to 14.4 kbps. The BS then proceeds to step 802.

In steps 802–806 the BS obtains the input parameters of the kth frame. In step 802 the BS calculates the total power available for data users, $P_a(k)$. The total power available to data users may be calculated by subtracting both the sum of the fundamental channel power levels and the sum of all other, or overhead, power levels (e.g., power levels for the pilot channel, paging channel, sync channel, and control channel) from the maximum power for the BS (which is fixed). The BS then proceeds to step 804. In step 804 the BS obtains the FCH transmit power, $P_i^F(k)$, of frame k of each data user i, where $i=1,2,\ldots,N$, there being N users. The FCH power level is obtained by integrating the power control groups in each frame over time for a number of previous frames and then predicting the instantaneous power required for the kth frame, as specified in cdma2000. The BS then proceeds to step 806. In step 806 the BS obtains the FCH transmit rate, $R_i^F(k)$, of frame k of each data user i, for $i=1,2,\ldots,N$. The transmit rate is fixed during a data call, and may be either full rate (e.g., 9.6 kbps or 14.4 kbps), half rate, quarter rate, or eighth rate, as specified in cdma2000. The BS then proceeds to step 808.

In steps 808–810 the BS calculates the possible SCH rate, $R_i(k)$, and the priority index, $I_i(k)$, for each data user. In step 808 the BS determines the possible SCH rate for each user in accordance with the following equation:

$$R_i(k) = \frac{R_i^F(k) P_a(k)}{P_i^F(k) \alpha_{PM} \alpha_{ASM}} \left(\frac{P_{CC}}{P_{TC}}\right), (i = 1, 2, \ldots, N),$$

where $P_{TC}$ is the power needed to transmit data at rate $R_i^F(k)$ with a Turbo decoder, and $P_{CC}$ is the power needed to transmit data at rate $R_i^F(k)$ with a convolutional decoder. The values $P_{TC}$ and $P_{CC}$ are derived through simulations and stored in a lookup table in the BS prior to operation. The value $\alpha_{PM}$ is the transmit power prediction margin, which is greater than one. The value $\alpha_{ASM}$ is the active set margin, which is greater than one (while the FCH active set is greater than one, allowing one or more BSs to be in simultaneous communication with a user for a voice call, the SCH is equal to one, restricting data calls from a user to just one BS). The BS then proceeds to step 810. In step 810 the BS determines the priority index for each user in accordance with the following equation:

$$I_i(k) = R_i(k)/(T_i(k), (i=1,2,\ldots,N).$$

The BS then proceeds to step 812.

In steps 812–830 the BS calculates the actual SCH transmit rate, $R^*_j(k)$, for each user, j, assuming $S=\{1,2,\ldots,N\}$ and $P_r(k) = P_a(k)$, where $P_r(k)$ = remaining power available, and S is the new user set. In step 812 the BS lets $$I_j(k) = \max_{i \in S} \{I_i(k)\}$$

and fits $R_j(k)$ to a number of available rates $(r_1 < r_2, \ldots, < r_M)$ such that $r_l \leq R_j(k) < r_{l+1}$. The number of rates could be any number of rates as negotiated between the BS and the data user via a signaling channel. In a particular embodiment the number of available rates is three. The BS then proceeds to step 814. In step 814 the BS determines whether $R_j(k) < r_l$. If $R_j(k)$ is less than $r_1$, the BS proceeds to step 816. If, on the other hand, $R_j(k)$ is not less than $r_1$, the BS proceeds to step 818. In step 816 the BS sets the actual transmit rate for user j, $R^*_j(k)$, equal to zero. In step 818 the BS determines whether $R_j(k) > r_M$. If $R_j(k)$ is greater than $r_M$, the BS proceeds to step 820. If, on the other hand, $R_j(k)$ is not greater than $r_M$, the BS proceeds to step 822. In step 820 the BS sets the actual transmit rate for user j, $R^*_j(k)$, equal to $r_M$. In step 822 the BS sets the actual transmit rate for user j, $R^*_j(k)$, equal to $r_l$. The BS then proceeds to step 824.

In step 824 the BS updates the remaining power available, $P_r(k)$, in accordance with the following equation:

$$P_r(k) = P_r(k) - \frac{R^*_j(k) P_j^F(k) \alpha_{PM} \alpha_{ASM}}{R_j^F(k)} \left(\frac{P_{CC}}{P_{TC}}\right)^{-1}.$$

The BS then proceeds to step 826. In step 826 the BS updates the new user set, S, by subtracting user j from the user set, S. The BS then proceeds to step 828. In step 828 the BS updates the new transmit rate, $R_i(k)$, in accordance with the following equation:

$$R_i(k) = \frac{R_i^F(k)P_a(k)}{P_i^F(k)\alpha_{PM}\alpha_{ASM}}\left(\frac{P_{CC}}{P_{TC}}\right), i \in S.$$

The BS then proceeds to step 830. In step 830 the BS determines whether the user set, S, is not equal to zero. If the user set, S, is not the empty set, φ, the BS returns to step 812 to begin an iteration through steps 812 to 830 to calculate the actual SCH transmit rate for the next user $R^*_j(k)$, for the next user, j. If, on the other hand, the user set, S, is the empty set, φ, the BS proceeds to step 832.

In steps 832–836 the BS sets the transmit rate and the transmit power for each user, and updates the user throughput, $T_i(k)$, for the kth frame. In step 832 the BS transmits data at the rate $R^*_i(k),(i=1,2,\ldots,N)$. The BS then proceeds to step 834. In step 834 the BS updates the transmit power for user i in accordance with the following equation:

$$P_i^*(k) = \frac{P_i(k)}{\sum_j P_j(k)}P_a(k),$$

where $P_i(k) = \frac{R_j^*(k)P_j^F(k)\alpha_{PM}\alpha_{ASM}}{R_j^F(k)}\left(\frac{P_{CC}}{P_{TC}}\right)^{-1}.$ The BS then proceeds to step 836. In step 836 the BS updates the user throughput, $T_i(k)$, for the kth frame, in accordance with the following equation:

$$T_i(k)=(1-1/t)T_i(k)+R*_i(k)/t,$$

where t is the window size in number of frames. The BS then returns to step 802 to begin processing the next frame.

Figure 10:
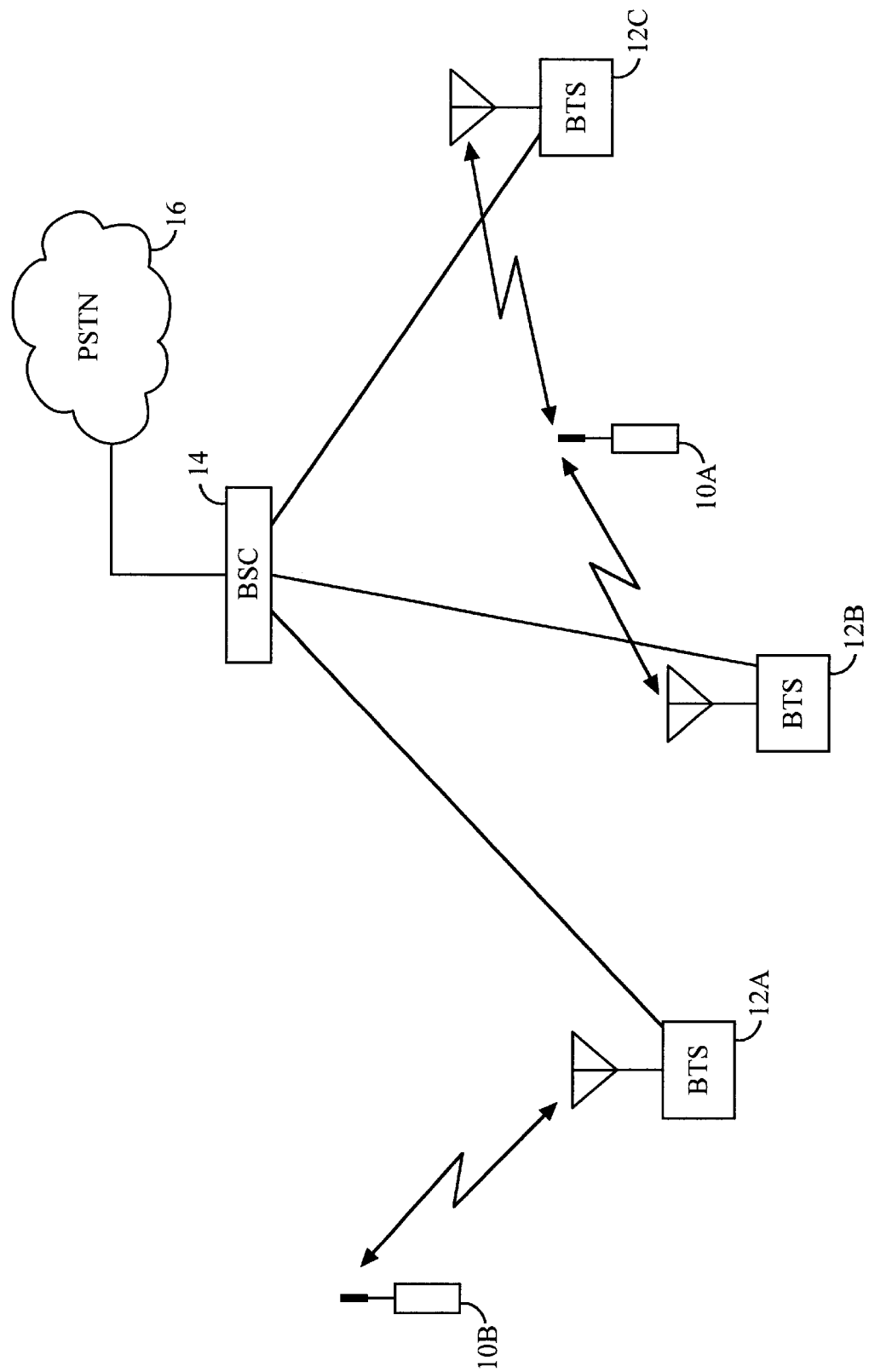
FIG. 10 is a diagram of a data communication system wherein soft and softer handoff can occur.

The previously described methods of FL transmit power and rate scheduling may be extended to cases of soft and softer handoff. FIG. 10 illustrates a MS 10A in soft handoff. To provide increased robustness in cellular systems, soft handoff is performed as MS 10A moves from the coverage area of one Base Station Transceiver (BTS) 12B to the coverage area of another BTS 12C. Soft handoff is the process of establishing a Radio Frequency (RF) link with the second BTS 12C before terminating the RF link with the first BTS 12B. In FIG. 1, one MS 10A is shown interfacing with two BTSs 12B, 12C and therefore in soft handoff. Soft handoff can be contrasted with hard handoff during which the RF link with the first BTS 12B is terminated before the RF link with the second BTS 12C is established. By maintaining at least one RF link at all times, soft handoff increases the likelihood that the communications signal will continue uninterrupted during the transition from coverage area of one cell to the coverage area of another cell.

Softer handoff is the process whereby MS 10 communicates with multiple sectors of a cell which are serviced by the same BTS 12. During softer handoff, an RF link with a second sector of a BTS 12 is established before terminating the RF link with the first sector of the same BTS 12.

The BTSs 12 interface to a Public Switched Telephone Network 16 (PSTN) through a BSC14. As a central controller for the BTSs, the BSC maintains transmit power and rate information for all the sectors of the BTSs under control of the BSC. The first BTS 12b controls the sectors in the first cell, and maintains information about the sectors in the first cell. The second BTS 12C controls the sectors in the second cell and maintains information about the sectors in the second cell. The previous methods employ the BTSs 12 to make FL SCH transmit power level decisions based on very recent information about the FORWARD LINK transmit power for the FCH, or C/I messages received from the MS 10.

When a MS 10 supporting a SCH goes into softer handoff, the MS 10 receives transmit power and rate information from multiple sectors of the same cell. The BTS 12 has information about the transmit power levels in both of the sectors and can make a timely estimate of how much SCH transmit power is needed. The previously described methods for determining SCH transmit power and rate apply to the MS 10 in softer handoff. In softer handoff, however, the BTS 12 uses the FORWARD LINK FCH transmit power information (or C/I messages) from all the sectors involved in the softer handoff. During softer handoff, the ratios of power transmitted from multiple sectors of one cell are known by the BTS 12, enabling determination of FORWARD LINK power required for transmitting data on a SCH from power requirements on the FCH. A user may or may not receive data from both sectors even though a voice user would receive signal from both sectors in a cell during softer handoff. By knowing the power ratios applied to an entire cell, a user between sectors during softer handoff is treated like two users, with one user in each sector.

When a MS 10 supporting a SCH goes into soft handoff, the MS communicates with two different cells. Each BTS 12 only has access to information from the cell controlled by the BTS 12. To make a SCH transmit power and rate decision in soft handoff based on FCH transmit power information (or C/I messages), information about both cells involved in the soft handoff must be maintained by a central controller. The central controller can either be a BSC 14 or one of the BTSs 12 that receives FCH transmit power and rate (or C/I) messages from the other BTS 12 through the BSC 14. In either case, there is a relatively large messaging delay that renders the required information untimely. The power required for data transmission on the SCH can be determined using the power required for transmitting voice on the FCH when only one BTS 12 is transmitting power to a user. During soft handoff it is not possible use power requirements on the FCH to determine power needed on the SCH because the voice channel has more than one cell transmitting signals to the user simultaneously. There is no longer a one to one mapping of a BTS 12 to a MS 10 in soft handoff. Different cells have different channels conditions. The channel conditions of cells are known only to the BTS 12 controlling the cell. Therefore, the BTS 12 cannot calculate ratios of distributed power caused by fading conditions during soft handoff.

Instead of trying to respond quickly to channel changes using delayed messages during soft handoff, the SCH is treated as a persistent user, such as a voice user. Instead of transmitting only when the channel conditions are deemed optimal based on very recent channel information, transmission on the SCH during soft handoff is continuous. Even though transmission on the SCH may occur at less than optimal times, using more power than if the transmissions were based on channel sensitive information, total power consumption can be less in soft handoff due to the multipath diversity provided by combining the signals from both the BTSs 12 involved in the soft-handoff. Transmission scheduling based on channel sensitive information is resumed when the MS 10 is no longer in soft handoff.

The algorithms of the previously disclosed embodiments for FORWARD LINK power and rate scheduling applied during no handoff or hard handoff conditions apply to softer handoff using information from all the sectors involved in the softer handoff, and to soft handoff by transmitting continuously to the user instead of scheduling transmission for the user based on recent power and rate (or C/I) information. Softer handoff using the disclosed algorithm is supported using information available to the BTS 14 from all applicable sectors. Soft handoff is supported by removing the data user from the disclosed scheduling algorithm, and transmitting continuously to the user until soft handoff is complete. While transmitting continuously to the user during soft handoff, a power and a rate are selected that is not channel sensitive. The power level selected during soft handoff is based on average required power rather than recent measurements of the channel.

In one embodiment, soft handoff can be postponed until a previous link can no longer be maintained in order to prevent fading conditions from causing a data user to bounce between BTSs 12, and incurring subsequent transmission delays. In another embodiment, bouncing is prevented by switching the user to a new link at a predetermined instant.

In accordance with the above-described embodiments, the available power in a BS is used for forward-link data calls after accommodating voice traffic. Total system throughput is balanced with fairness in a proportional fairness implementation, or other suitable algorithm. A sustainable data rate is predicted in the BS. The transmit power of the FCH is multiplied by gain factors for the SCH in accordance with an exemplary embodiment. Multiple users may transmit simultaneously until all the available power is used.

As understood by those of skill, other channels such as, e.g., the DCCH control channel, as specified in cdma2000, may be used instead of the FCH in alternate embodiments. Accordingly, for example, the transmit power of the DCCH (which is convolutionally encoded) is multiplied by an appropriate gain factor for the SCH (which is Turbo encoded).

Thus, a novel and improved method and apparatus for forward-link scheduling in a wireless communication system during soft and softer handoff have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the invention. Thus, the disclosed embodiments are not intended to be limited to the embodiments shown herein but is to be accorded the widest scope consistent with the principles and novel features disclosed herein.

What is claimed is:

1. A method of scheduling transmit rates and transmit power levels of data users in a wireless communication system during softer handoff, comprising:

transmitting signals between a base station having at least two sectors and a remote station via at least one first channel per sector, wherein the transmitted signals comprise voice-data;

measuring at the base station a ratio of transmission power levels for the voice-data transmitted via the at least one first channel per sector;

determining a historical profile for the ratio of transmission power levels; and using the historical profile for the ratio of transmission power levels to select a second channel transmission power level and data rate for transmitting additional data.

2. The method in accordance with claim 1, further comprising:

measuring at the remote station transmission metrics reflecting the quality of voice-data signals received from the base station sectors;

messaging from the remote station to the base station any change or non-change in the voice-data quality; and adjusting or not adjusting the transmission power in consideration of said messages for voice-data transmitted by the base station sectors.

3. A signal bearing medium tangibly embodying a program of machine-readable instructions executable by a processor to perform a method for predicting a favored slot for transmitting data in a wireless communication system during softer handoff, the instructions comprising:

transmitting signals containing voice-data between a base station having at least two sectors and a remote station;

measuring at the base station a ratio of transmission power levels for voice-data transmitted via the at least one first channel per sector;

determining a historical profile for the ratio of transmission power levels; and using the historical profile of the ratio of transmission power levels to select a second channel transmission power level and data rate for transmitting additional data.

4. The signal-bearing medium in accordance with claim 3, wherein the instructions further comprise:

measuring at the remote station transmission metrics reflecting the quality of voice-data signals received from the sectors of the base station;

messaging from the remote station to the base station any change or non-change in the voice-data quality; and adjusting or not adjusting the transmission power of the sectors in consideration of said messages for voice-data transmitted by the base station.

5. The signal-bearing medium in accordance with claim 3, wherein the instructions further comprise:

measuring at the remote station transmission metrics reflecting the quality of voice-data signals received from the base station;

messaging from the remote station to the base station any change or non-change in the voice-data quality; and adjusting or not adjusting the transmission power in consideration of said messages for voice-data transmitted by the base station.

6. A base station for scheduling transmit rates and transmit power levels of data users in a wireless communication system during softer handoff, the base station having at least two sectors communicatively coupled to a remote station, wherein the base station may communicate with the remote station using more than one channel, the base station comprising:

a transmitter, the transmitter capable of transmitting voice and non-voice data signals between a base station and a remote station; and a processor communicatively coupled to the transmitter and capable of executing instructions to:

measure at the base station transmission power levels for voice-data transmitted to the remote station via at least one first channel per sector;

determine a dynamic transmission power level for transmissions made via the at least one first channel per sector; and use the dynamic transmission power level to select a second channel transmission slot for transmitting additional data to the remote station.

7. A method of scheduling transmit rates and transmit power levels of data users in a wireless communication system, comprising:

transmitting signals between a base station and a remote station via at least one first channel, wherein the transmitted signals comprise voice-data;

measuring at the base station transmission power levels for the voice-data transmitted via the at least one first channel;

determining a historical profile for the transmission power levels;

using the historical profile for the transmission power levels to select a second channel transmission power level and data rate for transmitting additional data;

selecting a soft handoff power level and transmission rate based on average required power; and transmitting continuously to the user at the soft handoff power level and transmission rate during soft handoff.

8. The method of claim 7, further comprising:

measuring at the remote station transmission metrics reflecting the quality of voice-data signals received from the base station;

messaging from the remote station to the base station any change or non-change in the voice-data quality; and adjusting or not adjusting the transmission power in consideration of said messages for voice-data transmitted by the base station.

9. A signal bearing medium tangibly embodying a program of machine-readable instructions executable by a processor to perform a method for scheduling transmit rates and transmit power levels of data users in a wireless communication system, the instructions comprising:

transmitting signals containing voice-data between a base station and a remote station;

measuring at the base station transmission power levels for voice-data transmitted via at least one first channel;

determining a historical profile for the transmission power levels;

using the historical profile of the transmission power levels to select a second channel transmission power level and data rate for transmitting additional data;

selecting a soft handoff power level and transmission rate based on average required power; and transmitting continuously to the user at the soft handoff power level and transmission rate during soft handoff.

10. A base station for scheduling transmit rates and transmit power levels of data users in a wireless communication system, the base station communicatively coupled to a remote station, wherein the base station may communicate with the remote station using more than one channel, the base station comprising:

a transmitter, the transmitter capable of transmitting voice and non-voice data signals between a base station and a remote station; and a processor communicatively coupled to the transmitter and capable of executing instructions to:

measure at the base station transmission power levels for voice-data transmitted to the remote station via at least one first channel;

determine a dynamic transmission power level for transmissions made via the at least one first channel;

use the dynamic transmission power level to select a second channel transmission slot for transmitting additional data to the remote station;

select a soft handoff power level and transmission rate based on average required power; and transmit continuously to the user at the soft handoff power level and transmission rate during soft handoff.

* * * * *